US011582756B2

United States Patent
Liu et al.

(10) Patent No.: US 11,582,756 B2
(45) Date of Patent: Feb. 14, 2023

(54) SYSTEM AND METHOD FOR BEAM MANAGEMENT

(71) Applicant: Huawei Technologies Co., Ltd., Shenzhen (CN)

(72) Inventors: Bin Liu, San Diego, CA (US); Xiaoyong Yu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/277,575

(22) PCT Filed: Apr. 28, 2019

(86) PCT No.: PCT/CN2019/084786
§ 371 (c)(1),
(2) Date: Mar. 18, 2021

(87) PCT Pub. No.: WO2020/062859
PCT Pub. Date: Apr. 2, 2020

(65) Prior Publication Data
US 2022/0039081 A1 Feb. 3, 2022

Related U.S. Application Data

(60) Provisional application No. 62/735,406, filed on Sep. 24, 2018.

(51) Int. Cl.
*H04W 4/029* (2018.01)
*H04W 72/04* (2023.01)
(Continued)

(52) U.S. Cl.
CPC .......... *H04W 72/048* (2013.01); *G01P 13/00* (2013.01); *H04W 4/027* (2013.01); *H04W 4/029* (2018.02); *H04W 72/046* (2013.01)

(58) Field of Classification Search
CPC .......... H04W 36/00835; H04W 76/25; H04W 72/085; H04W 52/24; H04W 72/0891;
(Continued)

(56) References Cited

U.S. PATENT DOCUMENTS 10,098,091 B2 * 10/2018 Seol ................... H04B 7/0695
11,233,548 B2 * 1/2022 Wang ................... H04L 5/0023
(Continued)

FOREIGN PATENT DOCUMENTS

| CN | 1866620 A | 11/2006 |
| CN | 102832985 A | 12/2012 |

(Continued)

OTHER PUBLICATIONS

"Architecture Approaches for 5G Millimetre Wave Access Assisted by 5G Low-Band Using Multi-Connectivity" by Danish Aziz • Jens Gebert • Anton Ambrosy • Hajo Bakker • Hardy Halbauer in 2016 IEEE Globecom Workshops (GC Wkshps) (pp. 1-6) Dec. 1, 2016 (Year: 2016).*

(Continued)

*Primary Examiner* — William D Cumming
(74) *Attorney, Agent, or Firm* — Slater Matsil, LLP

(57) ABSTRACT

A method for operating an access node includes receiving motion information from a user equipment (UE) in accordance with a communications beam, determining a predicted area of the UE in accordance with the motion information, configuring multiple tracking beams in accordance with the predicted area of the UE, and sending the multiple tracking beams.

19 Claims, 8 Drawing Sheets

(51) Int. Cl.
*G01P 13/00* (2006.01)
*H04W 4/02* (2018.01)
*H04W 72/044* (2023.01)

(58) Field of Classification Search
CPC ............... H04W 16/28; H04W 72/046; H04W 74/0841; G08G 1/096716
USPC .................... 455/425; 370/331, 252, 321
See application file for complete search history.

(56) References Cited

U.S. PATENT DOCUMENTS

| | | | |
|---|---|---|---|
| 11,399,258 B2* | 7/2022 | Zaloom | H04W 4/029 |
| 2001/0034239 A1* | 10/2001 | Yamato | G08G 1/096716 |
| | | | 455/524 |
| 2003/0043761 A1* | 3/2003 | Hladik | H04B 7/212 |
| | | | 370/321 |
| 2014/0146863 A1* | 5/2014 | Seol | H04B 7/0617 |
| | | | 375/224 |
| 2014/0185481 A1* | 7/2014 | Seol | H04W 52/24 |
| | | | 370/252 |
| 2014/0204902 A1* | 7/2014 | Maltsev | H04W 36/00835 |
| | | | 370/331 |
| 2017/0026962 A1 | 1/2017 | Liu et al. | |
| 2017/0359106 A1 | 12/2017 | Wilson et al. | |
| 2018/0152933 A1* | 5/2018 | Berglund | H04W 72/046 |
| 2018/0332520 A1* | 11/2018 | Cheng | H04W 74/0891 |
| 2019/0066504 A1* | 2/2019 | Zaloom | G08G 1/144 |
| 2019/0222384 A1* | 7/2019 | Wu | H04W 16/28 |
| 2019/0387515 A1* | 12/2019 | Stauffer | H04L 5/0048 |
| 2020/0403658 A1* | 12/2020 | Wang | H04B 7/0417 |
| 2021/0250781 A1* | 8/2021 | Dang | H04B 7/0408 |
| 2022/0014874 A1* | 1/2022 | Zaloom | H04W 4/023 |
| 2022/0039081 A1* | 2/2022 | Liu | H04B 7/088 |
| 2022/0158702 A1* | 5/2022 | Nallampatti Ekambaram | |
| | | | H04W 64/003 |
| 2022/0322033 A1* | 10/2022 | Zaloom | H04W 4/027 |

FOREIGN PATENT DOCUMENTS

| | | | | |
|---|---|---|---|---|
| CN | 104486775 A | | 4/2015 | |
| CN | 107135021 A | | 9/2017 | |
| CN | 107819502 A | | 3/2018 | |
| CN | 107872253 A | | 4/2018 | |
| CN | 112823556 A | * | 5/2021 | ............. G01P 13/00 |
| WO | 2018054498 A1 | | 3/2018 | |
| WO | WO-2018059306 A1 | * | 4/2018 | ............... H04B 7/04 |
| WO | WO-2020078547 A1 | * | 4/2020 | ........... H04B 7/0617 |
| WO | WO-2021190723 A1 | * | 9/2021 | |
| WO | WO-2021207562 A1 | * | 10/2021 | ............... H04B 7/04 |

OTHER PUBLICATIONS

Z. Xiao et al., "A Survey on Millimeter-Wave Beamforming Enabled UAV Communications and Networking," in IEEE Communications Surveys & Tutorials, vol. 24, No. 1, pp. 557-610, Firstquarter 2022, doi: 10.1109/COMST.2021.3124512. (Year: 2022).*

M. A. Wickert and C. E. Anderson, "Dynamic modeling of a wireless LAN with access node beamformers to increase capacity," WCNC. 1999 IEEE Wireless Communications and Networking Conference (Cat. No. 99TH8466), 1999, pp. 46-50 vol. 1, doi: 10.1109/WCNC.1999.797783. (Year: 1999).*

* cited by examiner

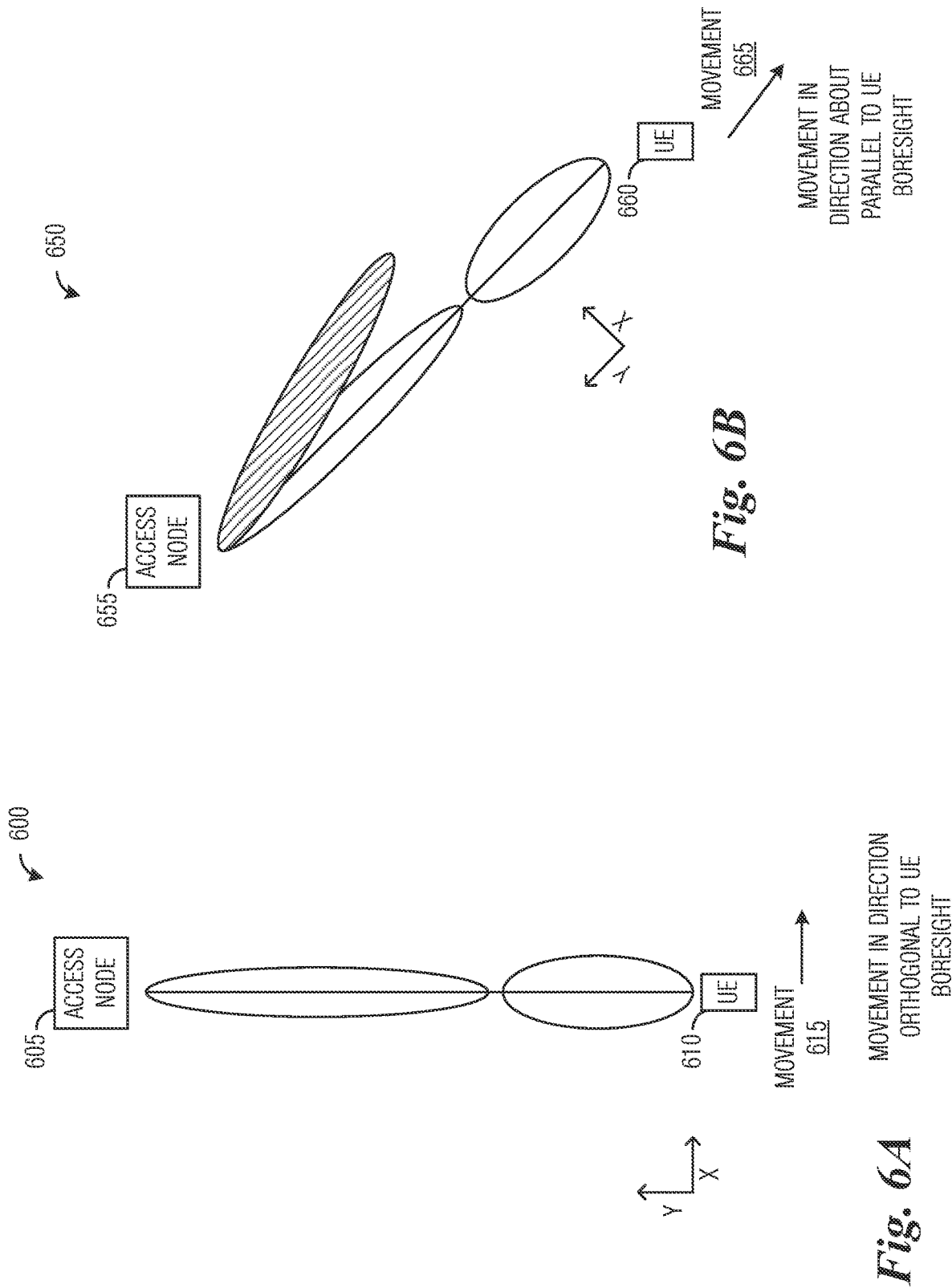

SYSTEM AND METHOD FOR BEAM MANAGEMENT

CROSS-REFERENCE TO RELATED APPLICATIONS

This application is a national phase filing under section 371 of PCT/CN2019/084786, filed Apr. 28, 2019, which claims the priority of U.S. Provisional Patent Application No. 62/735,406 filed Sep. 24, 2018 titled "System and Method for Beam Management," each of which is incorporated herein by reference in its entirety.

TECHNICAL FIELD

The present disclosure relates generally to a system and method for digital communications, and, in particular embodiments, to a system and method for beam management of tracking beams.

BACKGROUND

One possible deployment scenario for fifth generation (5G) New Radio (NR) system architecture uses high frequency (HF) (6 gigahertz (GHz) and above, such as millimeter wavelength (mmWave)) operating frequencies to exploit greater available bandwidth and less interference than what is available at the congested lower frequencies. However, pathloss is a significant issue. Beamforming may be used to overcome the high pathloss.

Tracking beams are commonly used to allow a user equipment (UE) to make measurements to determine a best communications beam, which is reported back to an access node serving the UE. Communications takes place using the reported best communications beam. However, the beams have a relatively narrow beamwidth. Therefore, depending upon a communications device's mobility, a fixed tracking beam configuration may not be able to allow a highly mobile UE to make the required measurements before the UE moves outside the coverage of the access node's serving beam and loses connectivity. Or on the other hand, a large amount of overhead associated with a large number of tracking beams is required to guarantee coverage of high mobility UE. Therefore, there is a need for systems and methods for managing the tracking beams.

SUMMARY

According to a first aspect, a computer-implemented method for computer-implemented method for operating an access node is provided. The method includes receiving, by the access node, motion information from a user equipment (UE) in accordance with a communications beam, determining, by the access node, a predicted area of the UE in accordance with the motion information, configuring, by the access node, multiple tracking beams in accordance with the predicted area of the UE, and sending, by the access node, the multiple tracking beams.

In a first implementation form of the computer-implemented method according to the first aspect as such, wherein the motion information is relative to the access node.

In a second implementation form of the computer-implemented method according to the first aspect as such or any preceding implementation form of the first aspect, wherein configuring the multiple tracking beams comprises specifying at least one of a beamwidth of the multiple tracking beams, a beamforming gain of the multiple tracking beams, a periodicity of the multiple tracking beams, a number of the multiple tracking beams, a slot offset of the multiple tracking beams, or a number of time-frequency resources of the multiple tracking beams.

In a third implementation form of the computer-implemented method according to the first aspect as such or any preceding implementation form of the first aspect, wherein the motion information comprises at least one of directional information of the UE or velocity information of the UE.

In a fourth implementation form of the computer-implemented method according to the first aspect as such or any preceding implementation form of the first aspect, the computer-implemented method further comprising receiving, by the access node, updated motion information from the UE, and adapting, by the access node, the multiple tracking beams in accordance with the updated motion information.

In a fifth implementation form of the computer-implemented method according to the first aspect as such or any preceding implementation form of the first aspect, wherein adapting the multiple tracking beams comprises adjusting at least one of the beamwidth of the multiple tracking beams, the beamforming gain of the multiple tracking beams, the periodicity of the multiple tracking beams, the number of the multiple tracking beams, the slot offset of the multiple tracking beams, or the number of time-frequency resources of the multiple tracking beams.

In a sixth implementation form of the computer-implemented method according to the first aspect as such or any preceding implementation form of the first aspect, wherein the multiple tracking beams comprises at least one channel state information reference signal (CSI-RS) resource set.

According to a second aspect, a computer-implemented method for computer-implemented method for operating a UE is provided. The method includes detecting, by the UE, motion information of the UE using a built-in sensor, sending, by the UE, the motion information to an access node in accordance with a communications beam, and receiving, by the UE, at least one tracking beam, wherein the at least one tracking beam is configured in accordance with the motion information.

In a first implementation form of the computer-implemented method according to the second aspect as such, wherein the motion information comprises at least one of directional information of the UE or velocity information of the UE.

In a second implementation form of the computer-implemented method according to the second aspect as such or any preceding implementation form of the second aspect, the computer-implemented method further comprising detecting, by the UE, updated motion information of the UE using the built-in sensor, and sending, by the UE, the updated motion information to an access node.

In a third implementation form of the computer-implemented method according to the second aspect as such or any preceding implementation form of the second aspect, the computer-implemented method further comprising projecting, by the UE, the motion information onto a coordinate system to obtain components of the motion information.

According to a third aspect, an access node is provided. The access node includes a non-transitory memory storage comprising instructions, and one or more processors in communication with the memory storage. The one or more processors execute the instructions to receive motion information from a UE in accordance with a communications beam, determine a predicted location of the UE in accordance with the motion information, configure multiple tracking beams in accordance with the predicted location of the UE, and send the multiple tracking beams.

In a first implementation form of the access node according to the third aspect as such, wherein the one or more processors further execute the instructions to specify at least one of a beamwidth of the multiple tracking beams, a beamforming gain of the multiple tracking beams, a periodicity of the multiple tracking beams, a number of the multiple tracking beams, a slot offset of the multiple tracking beams, or a number of time-frequency resources of the multiple tracking beams.

In a second implementation form of the access node according to the third aspect as such or any preceding implementation form of the third aspect, wherein the motion information comprises at least one of directional information of the UE or velocity information of the UE.

In a third implementation form of the access node according to the third aspect as such or any preceding implementation form of the third aspect, wherein the one or more processors further execute the instructions to receive updated motion information from the UE, and adapt the multiple tracking beams in accordance with the updated motion information.

In a fourth implementation form of the access node according to the third aspect as such or any preceding implementation form of the third aspect, wherein the one or more processors further execute the instructions to adjust at least one of the beamwidth of the multiple tracking beams, the beamforming gain of the multiple tracking beams, the periodicity of the multiple tracking beams, the number of the multiple tracking beams, the slot offset of the multiple tracking beams, or the number of time-frequency resources of the multiple tracking beams.

In a fifth implementation form of the access node according to the third aspect as such or any preceding implementation form of the third aspect, wherein the multiple tracking beams comprises at least one CSI-RS resource set.

According to a fourth aspect, a UE is provided. The UE includes a non-transitory memory storage comprising instructions, and one or more processors in communication with the memory storage. The one or more processors execute the instructions to detect motion information of the UE using a built-in sensor, send the motion information to an access node in accordance with a communications beam, and receive at least one tracking beam, wherein the at least one tracking beam is configured in accordance with the motion information.

In a first implementation form of the UE according to the fourth aspect as such, wherein the one or more processors further execute the instructions to detect updated motion information of the UE using the built-in sensor, and send the updated motion information to an access node.

In a second implementation form of the UE according to the fourth aspect as such or any preceding implementation form of the fourth aspect, wherein the one or more processors further execute the instructions to project the motion information onto a coordinate system to obtain components of the motion information.

An advantage of a preferred embodiment is that motion information of a UE is provided to an access node serving the UE, and the access node uses the motion information to enable the prediction of the location (or area) of the UE and configure tracking beams in accordance with the predicted location. The access node may also predict the movement of the UE and configure tracking beams to cover the movement of the UE over time. Therefore, the likelihood of configuring tracking beams that will provide adequate coverage for the UE is better than achievable when configuring a similar number of tracking beams without any knowledge or prediction of the location or movement of the UE.

BRIEF DESCRIPTION OF THE DRAWINGS

For a more complete understanding of the present example embodiments, and the advantages thereof, reference is now made to the following descriptions taken in conjunction with the accompanying drawings, in which:

FIG. 6A illustrates an example communications system highlighting motion in a direction orthogonal to the boresight of a UE according to example embodiments presented herein;

FIG. 6B illustrates an example communications system highlighting motion in a direction about parallel to the boresight of a UE according to example embodiments presented herein;

DETAILED DESCRIPTION OF ILLUSTRATIVE EMBODIMENTS

Figure 1:
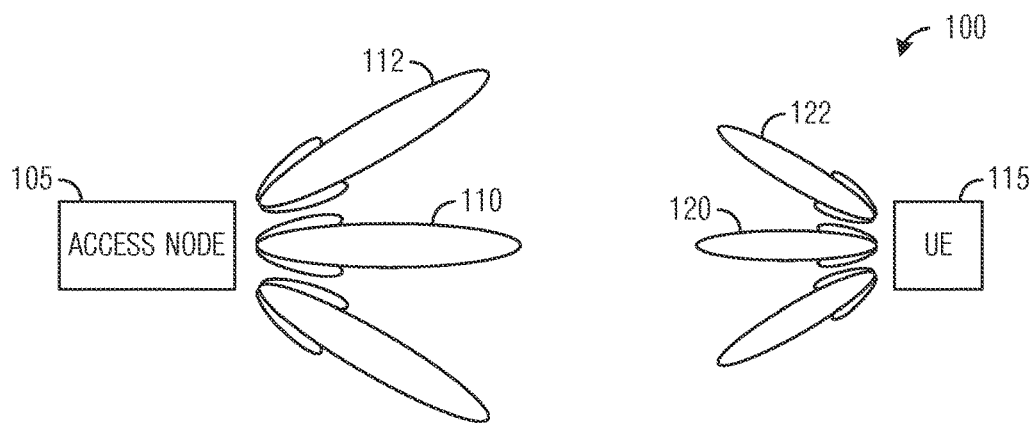
FIG. 1 illustrates an example wireless communications system.

FIG. 1 illustrates an example wireless communications system 100. Communications system 100 includes an access node 105 serving a user equipment (UE) 115. In a first operating mode, communications to and from UE 115 pass through access node 105. In a second operating mode, communications to and from UE 115 do not pass through access node 105, however, access node 105 typically allocates resources used by UE 115 to communicate. Access nodes may also be commonly referred to as Node Bs, evolved Node Bs (eNBs), next generation (NG) Node Bs (gNBs), master eNBs (MeNBs), secondary eNBs (SeNBs), master gNBs (MgNBs), secondary gNBs (SgNBs), network controllers, control nodes, base stations, access points, transmission points (TPs), transmission-reception points (TRPs), cells, carriers, macro cells, femtocells, pico cells, and so on, while UEs may also be commonly referred to as mobile stations, mobiles, terminals, users, subscribers, stations, and the like. Access nodes may provide wireless access in accordance with one or more wireless communication protocols, e.g., the Third Generation Partnership Project (3GPP) long term evolution (LTE), LTE advanced (LTE-A), 5G, 5G LTE, 5G NR, High Speed Packet Access (HSPA), Wi-Fi 802.11a/b/g/n/ac/ad/ax/ay, etc. While it is understood that communications systems may employ multiple eNBs capable of communicating with a number of UEs, only one eNB and one UE are illustrated for simplicity.

As discussed previously, pathloss in communications systems operating at high frequency (HF) (6 gigahertz (GHz) and above, such as millimeter wavelength (mm-Wave)) operating frequencies is high, and beamforming may be used to overcome the high pathloss. As shown in FIG. 1, both access node 105 and UE 115 communicate using beamformed transmissions and receptions. As an example, access node 105 communicates using a plurality of communications beams, including beams 110 and 112, while UE 115 communicates using a plurality of communications beams, including beams 120 and 122.

A beam may be a pre-defined set of beamforming weights in the context of codebook-based precoding or a dynamically defined set of beamforming weights in the context of non-codebook based precoding (e.g., Eigen-based beamforming (EBB)). A beam may also be a pre-defined set of phase shift preprocessors combining signals from the antenna array in the radio frequency (RF) domain. It should be appreciated that a UE may rely on codebook-based precoding to transmit uplink signals and receive downlink signals, while a TRP may rely on non-codebook based precoding to form certain radiation patterns to transmit downlink signals or receive uplink signals.

Figure 2:
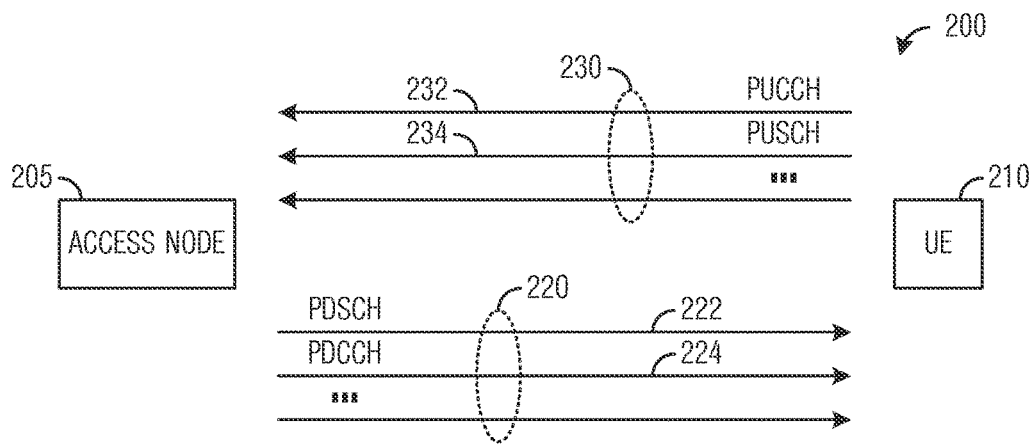
FIG. 2 illustrates a communications system highlighting an example channel structure between an access node and a UE.

FIG. 2 illustrates a communications system 200 highlighting an example channel structure between an access node 205 and a UE 210. In a bi-directional communications implementation, there is a downlink channel 220 and an uplink channel 230 between access node 205 and UE 210. Downlink channel 220 and uplink channel 230 may each include a plurality of unidirectional channels. As shown in FIG. 2, downlink channel 220 includes a physical downlink shared channel (PDSCH) 222 and a physical downlink control channel (PDCCH) 224 among others, while uplink channel 230 includes a physical uplink control channel (PUCCH) 232 and a physical uplink shared channel (PUSCH) 234 among others. Other channels may be present in downlink channel 220 or uplink channel 230 but are not shown in FIG. 2.

Figure 3:
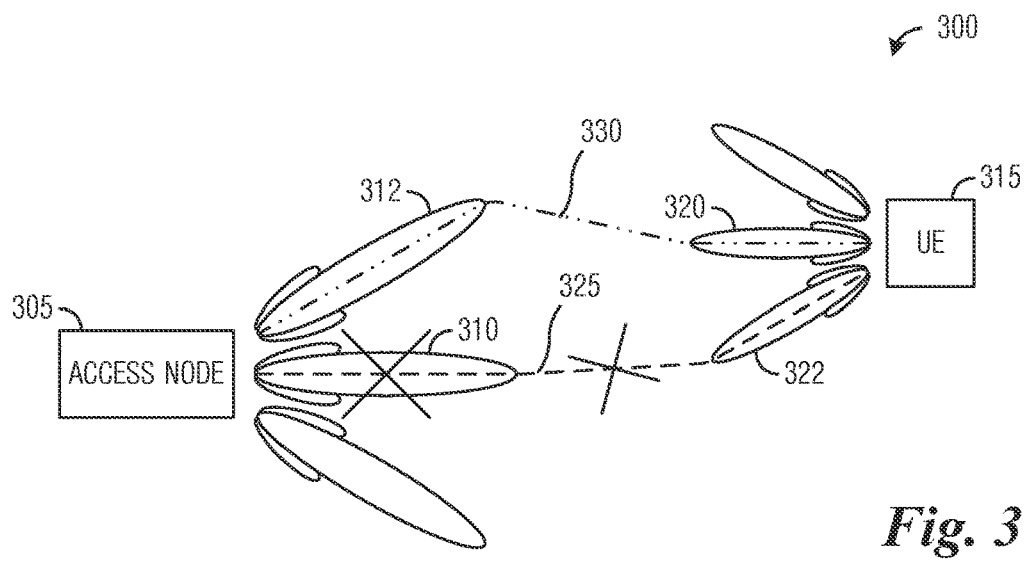
FIG. 3 illustrates a wireless communications system highlighting beam failure and beam failure recovery.

FIG. 3 illustrates a wireless communications system 300 highlighting beam failure and beam failure recovery. Communications system 300 includes an access node 305 serving a UE 315. As shown in FIG. 3, both access node 305 and UE 315 communicate using beamformed transmissions and receptions. As an example access node 305 communicates using a plurality of communications beams, including beams 310 and 312, while UE 315 communicates using a plurality of communications beams, including beams 320 and 322.

Initially, access node 305 and UE 315 are communicating through beam pair link (BPL) 325, which comprises beams 310 and 322. However, due to blockage or UE mobility, BPL 325 fails. UE 315 detects a candidate beam 312 from access node 305 to replace failed beam 310, for example. UE 315 initiates beam failure recovery by sending a beam failure recovery request (BFRQ) to access node 305. Upon completion of the beam failure recovery, BPL 330 is established (comprising beams 312 and 320).

When two or more reference signals, data signals, or resources are related in such a way that the two or more reference signals, data signals, or resources may be viewed as possessing similar characteristics, they are said to possess a quasi collocated (QCL) relationship. QCL relationships may refer to time, frequency, code, or spatial relationships between two or more reference signals, data signals, or resources, while spatial QCL refers to only spatial relationships between two or more reference signals, data signals, or resources. The spatial QCL information may include associations between signals and resources, such as channel status information reference signal (CSI-RS) resources and wideband reference signals (WBRS), or associations between individual WBRSs, or associations between CSI-RS resources and beamformed random access channels (BRACHs). As an example, in a one to one association, each CSI-RS signal is associated with one WBRS such that the transmit precoder for the CSI-RS signal is the same as a transmit precoder for the WBRS. As another example, each CSI-RS signal is associated with one WBRS such that the transmit precoder for the CSI-RS signal is the same as a transmit precoder for the WBRS. As another example, a first WBRS is associated with a second WBRS such that the transmit precoder for the second WBRS is the same as that for the first WBRS. It is possible that multiple CSI-RS signals are associated with a single WBRS, and vice versa. The spatial QCL information may be stored in tabular form or in a memory of a device. The spatial QCL information includes associations between CSI-RS and WBRSs. The spatial QCL information may be used by the UE to determine CSI-RS beam indices from WBRS beam indices, and vice versa, for example. As an example, in a one to one association, each CSI-RS signal is associated with one WBRS. It is possible that multiple CSI-RS signals are associated with a single WBRS, and vice versa.

An important feature of modern wireless communications systems is that the UEs are allowed to move in a totally unscripted manner. In 3GPP LTE, CSI-RS resources may be allocated for tracking purposes. The CSI-RS resources are transmitted in different angular directions (usually in a sweeping manner) and enable a UE to make measurements to determine which communications beam works best for the UE. For example, the UE may be able to detect the CSI-RS resources on three different communications beams and the communications beam that works best for the UE may be the communications beam associated with the measurement having the highest value. However, due to the relatively narrow beamwidths of the beamformed communications beams used in 5G NR communications systems operating at high carrier frequencies, the ability to track may be vulnerable to the movement of the UE. As an example, the movement of the UE can rapidly result in the UE moving out of the coverage area of the communications beam.

Figure 4:
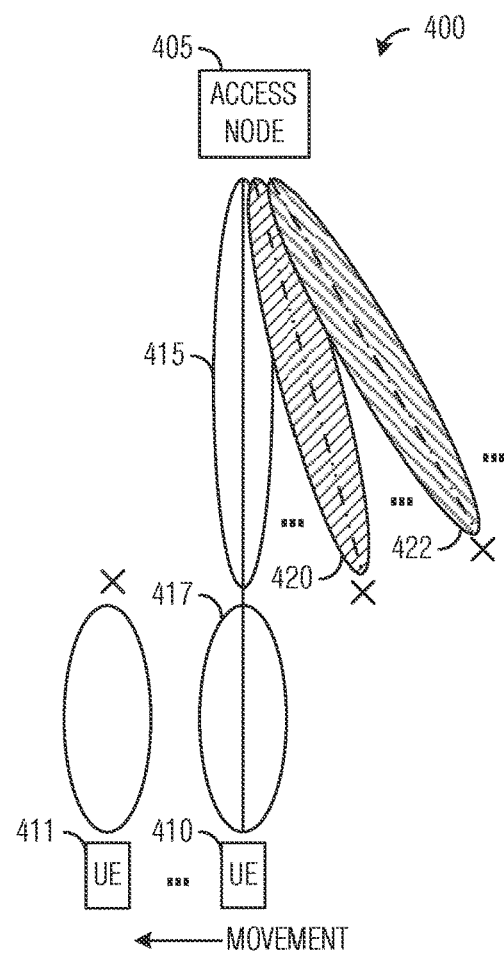
FIG. 4 illustrates an example communications system highlighting a situation where UE mobility presents a problem with tracking.

FIG. 4 illustrates an example communications system 400 highlighting a situation where UE mobility presents a problem with tracking. As shown in FIG. 4, an access node 405 and a UE 410 are communicating through communications beams 415 and 417, respectively. However, access node 405 has configured its tracking beams independent of the mobility of UE 410, which is moving in the opposite direction of tracking beam coverage area. Because UE 410 is moving in the opposite direction, UE may move out the coverage area of the tracking beams such that UE 410 is not able to detect any of the tracking beams transmitted by access node 405. Therefore, at a first time, UE 410 has moved to a new location (UE 410 at the new location is shown as UE 411 to avoid confusion). Because UE 410 has moved, it is possible that the connection between UE 410 and access node 405 is broken and UE 410 cannot find any new beams because it is not covered by the tracking beams at the new location.

The mobility of the UE has a significant impact on the ability to track the UE, as well as maintain the connection between the UE and the access node. Hence, if the access node has knowledge of information related to the mobility of the UE, the access node may be able to use the information in the management of the communications beams, including the tracking beams.

In 3GPP LTE, the configuration of a CSI-RS resource for tracking purposes may be specified in accordance with its periodicity and its offset. For example, the periodicity of a CSI-RS resource may range from 4 slots to 640 slots, with the offset being anywhere from 0 to the periodicity of the CSI-RS resource minus one. Therefore, there is a large amount of flexibility in configuring the tracking beams, including tracking beam number, tracking beam periodicity, and tracking beam frequency. Furthermore, an access node can adjust the beamforming applied to transmit the CSI-RS resources to achieve additional degrees of flexibility, such as beamwidth, and beamforming gain.

According to an example embodiment, a system and method for beam management utilizing motion information of a UE is provided. The motion information is used by an access node to configure tracking beams used to determine the best communications beams for the UE. In an embodiment, the motion information is used by the access node to predict the location or area of the UE and the access node configures one or more tracking beams to provide tracking beam coverage to the UE.

In general, a predicted location is more precise than a predicted area, with a predicted location being on the order of tens of feet, for example, while a predicted location being on the order of a fraction of a beamwidth coverage area, for example. However, both predicted location and predicted area are predictions of where the UE is going to be at a time in the future. Therefore, it is possible to consider a predicted location of a UE to be a predicted area of the UE with a tighter error tolerance. Hence, predicted area will be used to refer to both predicted area and location, with the difference being solely based on the error tolerance. A term that is similar to and can be used in place of predicting (as in predicting the area of the UE) is estimating (as in estimating the area of the UE).

In an embodiment, the access node configures one or more tracking beams to provide tracking beam coverage to the UE over time, with the one or more tracking beams providing coverage to the UE at predicted areas over time based on UE motion information. In an embodiment, the access node also uses the motion information to adjust the tracking beams to provide coverage to the UE. As an example, the access node adjusts the beamwidth or beamforming gain to ensure that coverage is provided to the UE. As yet another example, the access node increases the number of tracking beams configured to provide coverage to the UE if the UE is moving rapidly. As yet another example, the access node increases the frequency of tracking beams configured to provide coverage to the UE if the UE is moving rapidly. As yet another example, the access node decreases the number of tracking beams configured to provide coverage to the UE if the UE is moving slowly or has stopped moving. In general, the reconfiguring or adjusting of the tracking beams is referred to as beam management.

In an embodiment, the mobility of the UE, relative to the UE, is used in beam management. The mobility of the UE, relative to the UE, has an impact on the configuration of the tracking beams. As an example, if the UE is moving rapidly, but directly away from the access node, the access node may leave the number or frequency of the tracking beams unchanged because the UE is likely to remain in the coverage of the existing communications beam and not need to change communications beam. However, the access node may increase the beamforming gain of the tracking beam as the UE continues to move farther away from the access node. As an example, if the UE is moving rapidly but directly towards the access node, the access node may leave the number the tracking beams unchanged because the UE is likely to remain in the coverage of the existing communications beam and not need to change communications beam. As an example, if the UE is moving, either away or towards the access node, the access node may change an angle of inclination of the tracking beams to cover areas close to the access node (if the UE is moving towards the access node) or far from the access node (if the UE is moving away from the access node). The angle of inclination is relative to horizontal plane, such as the Earth, for example. The access node may also adjust the beamforming gain in such situations. The access node may also adjust the angle of inclination of the tracking beams in situations where the UE is moving in a direction that is not directly away or towards the access node. As another example, if the UE is moving rapidly in a direction orthogonal to the access node, the access node may need to configure the number or frequency of the tracking beams to provide coverage to the UE to enable the UE to make measurements of the tracking beams as the UE quickly moves through the coverage of the relatively narrow beamwidth communications beams. Furthermore, the access node may increase the beamwidth of the tracking beams to increase the amount of time that the UE remains in the coverage of each tracking beam.

In an embodiment, the mobility information of the UE is projected onto an orthogonal coordinate system, resulting in orthogonal components of the mobility of the UE along different axes of the orthogonal coordinate system. The access node uses the orthogonal components of the mobility of the UE to perform beam management. In an embodiment, the UE projects the mobility information onto an orthogonal coordinate system and provides the orthogonal components of the mobility of the UE to the access node, which uses the orthogonal components of the mobility of the UE to perform beam management. An example of a two-dimensional orthogonal coordinate system has a first axis that is parallel to a boresight of the UE's beam in use and a second axis that is orthogonal to the boresight of the UE's beam in use, where the boresight of the UE is the axis of maximum antenna gain and is usually oriented towards the access node. A similar three-dimensional orthogonal coordinate system may have a first axis that is parallel to a boresight of the UE and a second axis and a third axis that are both orthogonal to the boresight of the UE, as well as being orthogonal to each other.

Figure 5:
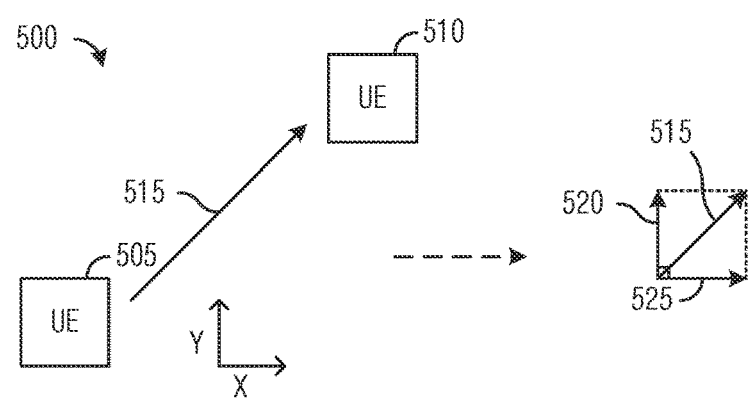
FIG. 5 illustrates a diagram of mobility information of a UE and an example projection of the mobility information onto an orthogonal coordinate system according to example embodiments presented herein.

FIG. 5 illustrates a diagram 500 of mobility information of a UE and an example projection of the mobility information onto an orthogonal coordinate system. FIG. 5 graphically displays the mobility of a UE 505 as UE 505 moves from a first location to a second location. At the second location, UE 505 is shown as UE 510 to avoid confusion. The mobility of UE 505 is shown graphically as a two-dimensional motion vector 515. Although the mobility of UE 505 is shown in two-dimensions (e.g., an X-Y coordinate system), the mobility of any UE may also take place in three-dimensional space. The example embodiments presented herein are operable in two or three dimensional space. Therefore, the illustration of two-dimensional motion should not be construed as being limiting to the scope or spirit of the example embodiments.

Motion vector 515 may be projected onto the two-dimensional X-Y coordinate system to obtain motion components in each of the two orthogonal components. As shown in FIG. 5, motion vector 515 has a Y-axis component 520 and an X-axis component 525. In an example, one of the two axes is aligned with the boresight of UE 505. The magnitude (i.e., length) of an orthogonal component of an axis is the amount of motion along the axis. As an example, if Y-axis component 520 and X-axis component 525 have approximately equal magnitude, then UE 505 is moving at approximately 45 degrees towards or away from the access node. As another example, if the Y-axis is aligned with the boresight of UE 505 and if Y-axis component 520 is approximately equal to motion vector 515 and X-axis component 525 is approximately equal to zero, then UE 505 is moving towards or away from the access node in the Y-axis.

Although the discussion presented herein focuses on orthogonal coordinate systems, the example embodiments are also operable with non-orthogonal coordinate systems in the determination of the motion components. Furthermore, the discussion focuses on coordinate systems relative to the UE. However, the example embodiments are operable with coordinate systems that are relative to the access node or any other reference point. Therefore, the focus on orthogonal coordinate systems relative to the UE should not be construed as being limiting to the scope or spirit of the example embodiments.

FIG. 6A illustrates an example communications system 600 highlighting motion in a direction orthogonal to the boresight of a UE. Communications system 600 includes an access node 605 and a UE 610. UE 610 is moving with motion vector 615. As shown in FIG. 6A, motion vector 615 is in the X-axis, a direction orthogonal to the boresight of UE 610.

FIG. 6B illustrates an example communications system 650 highlighting motion in a direction about parallel to the boresight of a UE. Communications system 650 includes an access node 655 and a UE 660. UE 660 is moving with motion vector 665. As shown in FIG. 6B, motion vector 665 has components mainly in the Y-axis, in a direction that is about parallel to the boresight of UE 610.

According to an embodiment, the motion information is provided by the UE. The UE utilizes sensors present in the UE to collect the motion information and reports the motion information to the access node. Modern UEs may include a large number of sensors, including but not limited to three-dimensional gyroscopes, accelerometers, magnetometers, global positioning system (GPS) sensors, and so on. In an embodiment, the UE processes the raw information from the sensors and reports the motion information to the access node. As an example, the motion information includes one or more of a direction of movement, a velocity of movement, a rate of movement, and so on. In a situation where the UE is not moving in a relatively consistent direction, the UE may further process the sensor information to determine a general direction of movement. As an example, the UE may average the various directions of movement to obtain the general direction of movement, with greater weight being applied to more recent movements, for example. In an embodiment, the UE reports raw information from the sensors to the access node, and the access node processes the raw information to determine the motion information.

According to an example embodiment, the UE projects the motion information onto a coordinate system and provides the orthogonal components of the motion information to the access node. In an example, the UE projects the motion information onto a two-dimensional orthogonal coordinate system and reports the orthogonal components of the motion information to the access node. In an example, the UE projects the motion information onto a three-dimensional orthogonal coordinate system and reports the orthogonal components of the motion information to the access node. In an example, the UE projects the motion information onto a two-dimensional non-orthogonal coordinate system and reports the non-orthogonal components of the motion information to the access node. In an example, the UE projects the motion information onto a three-dimensional non-orthogonal coordinate system and reports the non-orthogonal components of the motion information to the access node. The coordinate system may be relative to a UE, an access point, the absolute earth coordinate system, and so on. In all embodiments above, each component is represented by a velocity or a direction.

According to an example embodiment, the motion information is provided by the UE in a motion information report. In an embodiment, the UE is configured to provide the motion information report periodically. In an embodiment, the UE is configured to provide the motion information report upon receipt of an instruction or request to report the motion information. In an embodiment, the UE is configured to provide the motion information report upon a determination that the motion information has significantly changed from the previously reported motion information. The amount of change that qualifies as a significant change may be specified in a technical standard, an operator of the communications system, or by the devices themselves through collaborative techniques. In an embodiment, the motion information report is sent in a stand-alone message. In an embodiment, the motion information report is piggy-backed with another message, an acknowledgement, a random access attempt (such as a transmission of a random access preamble), a scheduling request, and so on.

Figure 7A:
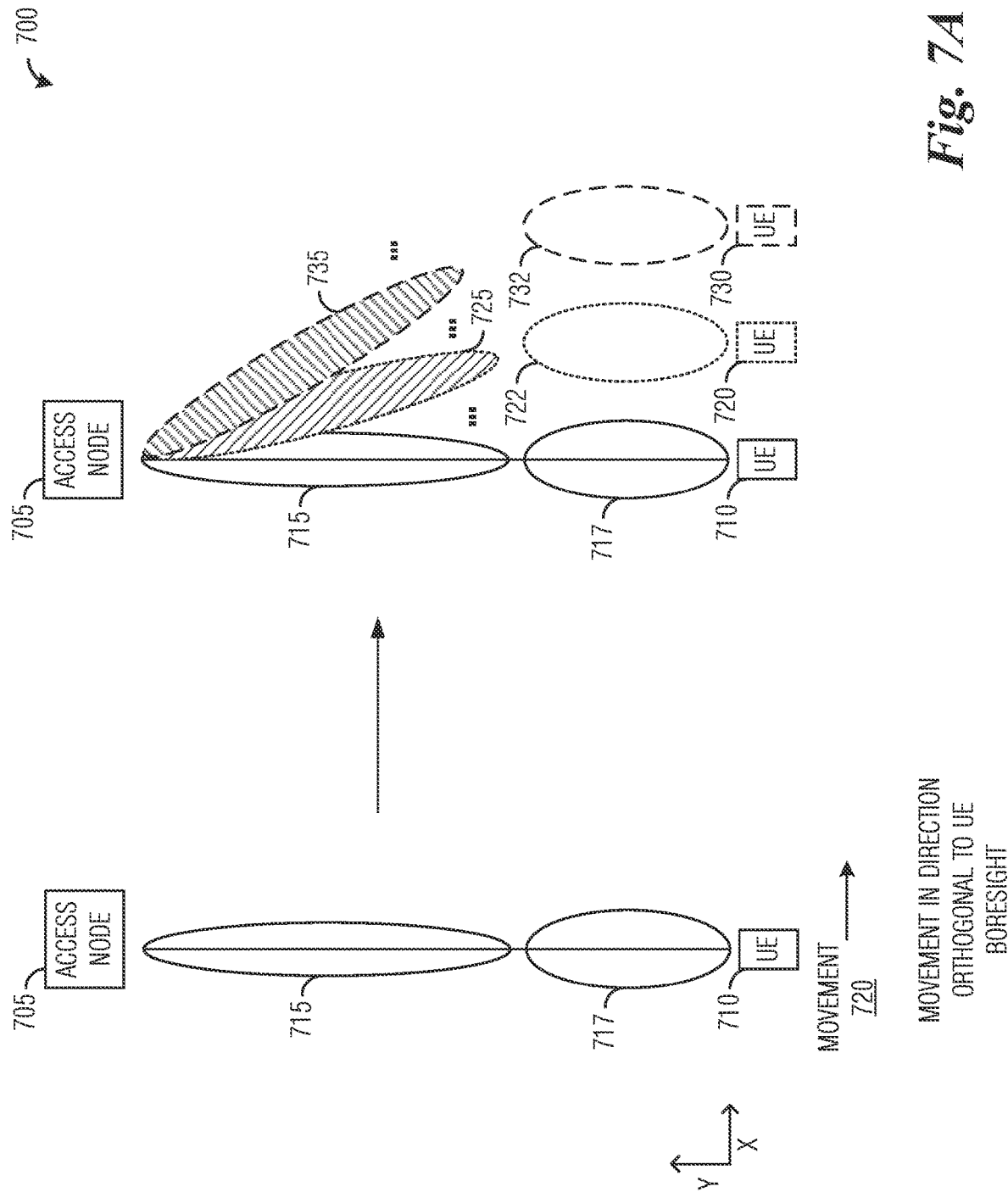
FIG. 7A illustrates a communications system highlighting an example configuration of tracking beams in accordance with motion information of a UE according to example embodiments presented herein.

FIG. 7A illustrates a communications system 700 highlighting a first example configuration of tracking beams in accordance with motion information of a UE. Communications system 700 includes an access node 705 serving a UE 710. Access node 705 is communicating using beam 715 and UE 710 is communicating using beam 717. UE 710 is moving with motion vector 720, which is orthogonal to the boresight of the beam used by UE 710.

Access node 705, using motion information provided by UE 710, predicts the location of UE 710. As an example, at a first time, access node 705 estimates that UE 710 is at a first location (shown as UE 720 communicating with beam 722 to avoid confusion) and at a second time, access node 705 estimates that UE 710 is at a second location (shown as UE 730 communicating with beam 732 to avoid confusion). Access node 705 configures tracking beams, such as tracking beams 725 and 735, to provide allow UE 710 to continue making measurements of tracking beams, determine best communications beams, and report the best communications beams. Because access node 705 has the motion information of UE 710, access node 705 is able to configure the tracking beams cover UE 710 at the first and second locations at about the times that UE 710 is expected to be at the first and second locations so that UE 710 will continue to make measurements of the tracking beams.

In the example shown in FIG. 7A, the UE is moving in a direction orthogonal to its boresight, hence the UE is rapidly moving through the coverage of a tracking beam. The access node, after obtaining orthogonal components of the motion vector, is able to determine that the movement of the UE is orthogonal to the access node and configure tracking beams accordingly. The access node may allocate the tracking beam favoring the UE's moving direction, for example. As an example, if the UE is moving rapidly, the access node can configure a larger number of tracking beams, or the access node may switch the tracking beams more frequently (i.e., increase tracking beam frequency). While if the UE is moving slowly, the access node can configure a smaller number of tracking beams, or decrease tracking beam frequency. Furthermore, if the UE is moving in a direction that is not orthogonal to the access node, the number of tracking beams may be smaller than the number of tracking beams configured by the access node if the motion was orthogonal to the access node, or the access node may switch the tracking beams less frequently.

Figure 7B:
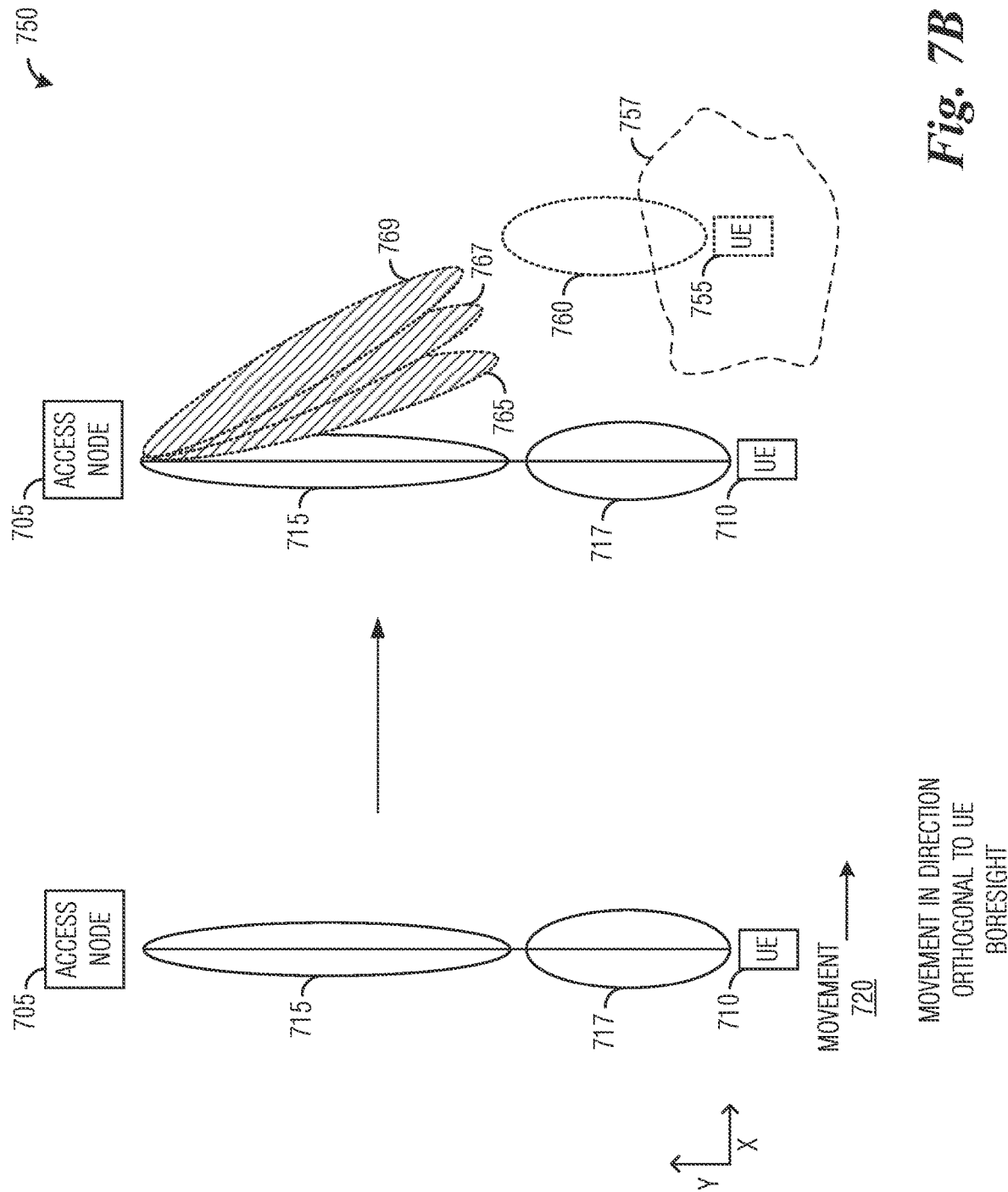
FIG. 7B illustrates communications system highlighting a second example configuration of tracking beam in accordance with motion information of a UE according to example embodiments presented herein.

FIG. 7B illustrates communications system 700 highlighting a second example configuration of tracking beam in accordance with motion information of a UE. Communications system 700 includes an access node 705 serving a UE 710. Access node 705 is communicating using beam 715 and UE 710 is communicating using beam 717. UE 710 is moving with motion vector 720, which is orthogonal to the boresight of UE 710.

Access node 705, using motion information provided by UE 710, predicts the area of UE 710. As an example, at a time, access node 705 estimates that UE 710 is in area 757 (shown as UE 755 located at the center of area 757 and communicating with beam 760 to avoid confusion). Access node 705 configures tracking beams, such as tracking beams 765, 767, and 769, to provide allow UE 710 to continue making measurements of tracking beams, determine best communications beams, and report the best communications beams. Because access node 705 has the motion information of UE 710, access node 705 is able to configure the tracking beams cover area 757 and UE 710 located therein so that UE 710 will continue to make measurements of the tracking beams.

The size of the predicted area, which may be a function of the mobility of the UE, has an impact on the number of tracking beams that the access node configures. As an example, if the size of a first predicted area is smaller than the size of a second predicted area, then the access node may be able to configure a smaller number of tracking beams to cover the first predicted area. Alternatively, the access node may configure the same number of tracking beams to cover the second predicted area, but the individual tracking beams has greater beamwidth. Alternatively, the access node may configure a larger number of tracking beams with lesser or equal beamwidth to cover the second predicted area.

As another example, if the UE is moving directly away from the access node, the access node may configure a tracking beam with increased beamforming gain to compensate for increased pathloss due to the increasing distance between the access node and the UE as the UE moves away from the access node. As yet another example, if the UE is moving directly towards the access node, the access node may configure a tracking beam with increased beamwidth to allow for sudden changes in direction of movement by the UE.

As yet another example, if the UE is moving in a direction that is in between directly toward or away from the access node and orthogonal to the access node, the access node may use any combination of increased number of tracking beams, decreased number of tracking beams, increased beamforming gain, or increased beamwidth, to help ensure that the UE continues to be able to make measurements of the tracking beams in a timely manner.

Figures 8, 9:
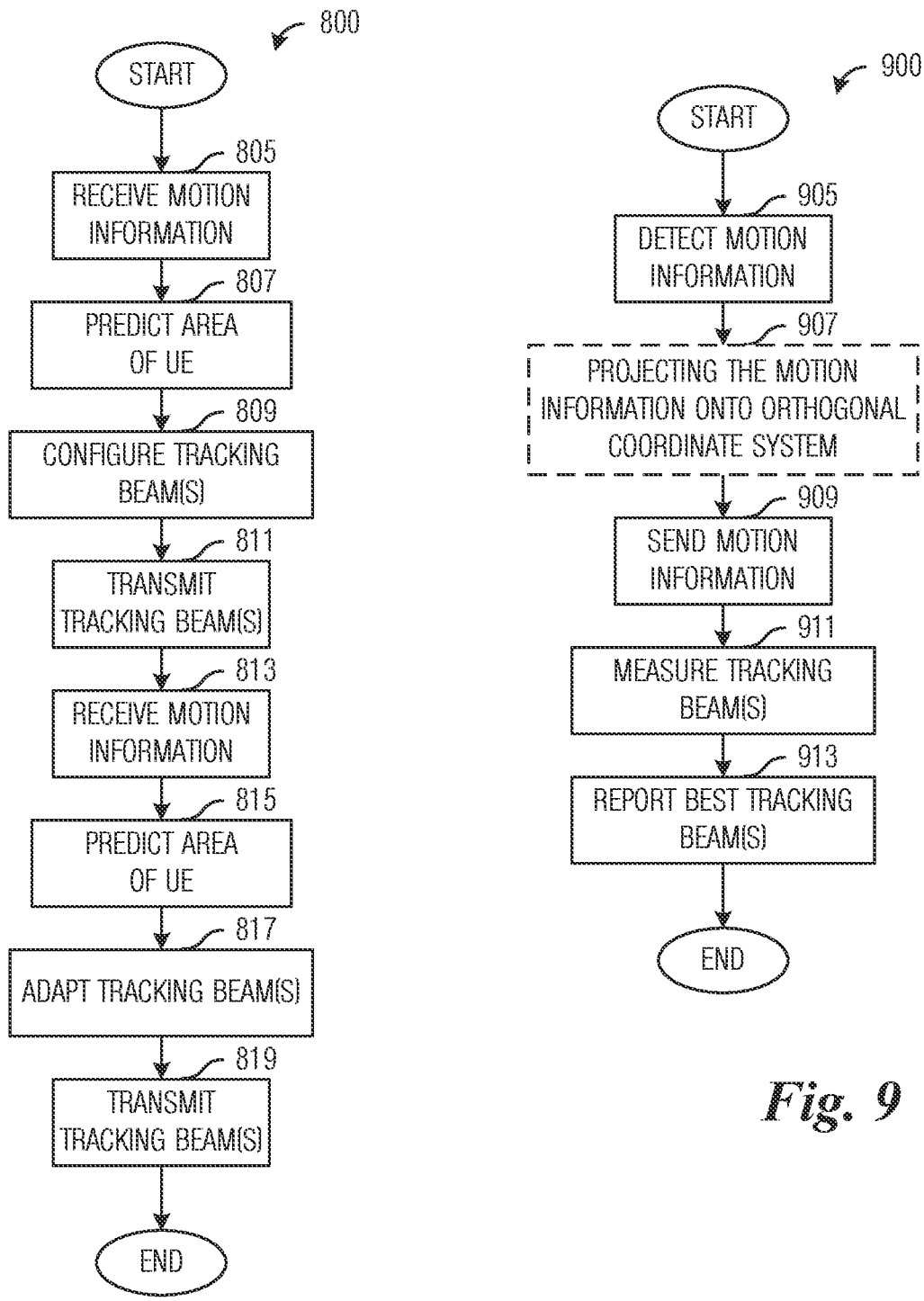
FIG. 8 illustrates a flow diagram of example operations occurring in an access node configuring tracking beams using motion information according to example embodiments presented herein.
FIG. 9 illustrates a flow diagram of example operations occurring in a UE reporting motion information and measuring tracking beams according to example embodiments presented herein.

FIG. 8 illustrates a flow diagram of example operations 800 occurring in an access node configuring tracking beams using motion information. Operations 800 may be indicative of operations occurring in an access node as the access node configures tracking beams in accordance with motion information provided by UEs served by the access node.

Operations 800 begin with the access node receiving motion information from one or more UEs served by the access node (block 805). The motion information may include velocity information of the UE, direction information of the UE, or both. The motion information may be received in a motion information report. The motion information report may be received separately or piggy-backed with another message or report. The motion information report may be received periodically or in response to a request or instruction. The access node predicts the area of the UE (block 807). The access node uses the motion information (or the orthogonal components of the motion information) to predict the area of the UE. The access node configures tracking beams to provide coverage for the UE (block 809). The access node may change the number of tracking beams, the frequency of the tracking beams, the period of the tracking beams, the beamwidth of the tracking beams, the beamforming gain of the tracking beams, or combinations thereof, to help ensure that the tracking beams cover the UE as the UE moves. The configuration of the tracking beams is performed using the predicted location of the UE. The tracking beams are transmitted in accordance with the configuration (block 811).

The access node receives additional motion information (block 813). The access node predicts the area of the UE (block 815). The access node uses the motion information (or the orthogonal components of the motion information) to predict the area of the UE. The access node adapts the tracking beams to provide coverage for the UE (block 817). The tracking beams are transmitted in accordance with the adapted configuration (block 819). Although the discussion presented herein focuses on the access node predicting the area of the UE using the motion information, and then performing beam management in accordance with the predicted area, if greater prediction precision is available to enable the access node to predict the location of the UE using the motion information, the access node may utilize the predicted location to perform beam management.

FIG. 9 illustrates a flow diagram of example operations 900 occurring in a UE reporting motion information and measuring tracking beams. Operations 900 may be indicative of operations occurring in a UE as the UE reports motion information and measures tracking beams.

Operations 900 begin with the UE detecting motion information (block 905). The motion information may be detected from sensors present in the UE. The motion information may include velocity information of the UE, direction information of the UE, or both. The UE may project the motion information onto a coordinate system to obtain components of the motion of the UE (block 907). The coordinate system may be orthogonal or non-orthogonal. The coordinate system may be two-dimensional or three-dimensional. The UE reports the motion information (block 909). The UE measures tracking beams (block 911). The UE reports the best tracking beam(s) (block 913). The UE may measure more than one tracking beams and selects a tracking beam(s) with the highest measurement as the best tracking beam(s).

Figure 10:
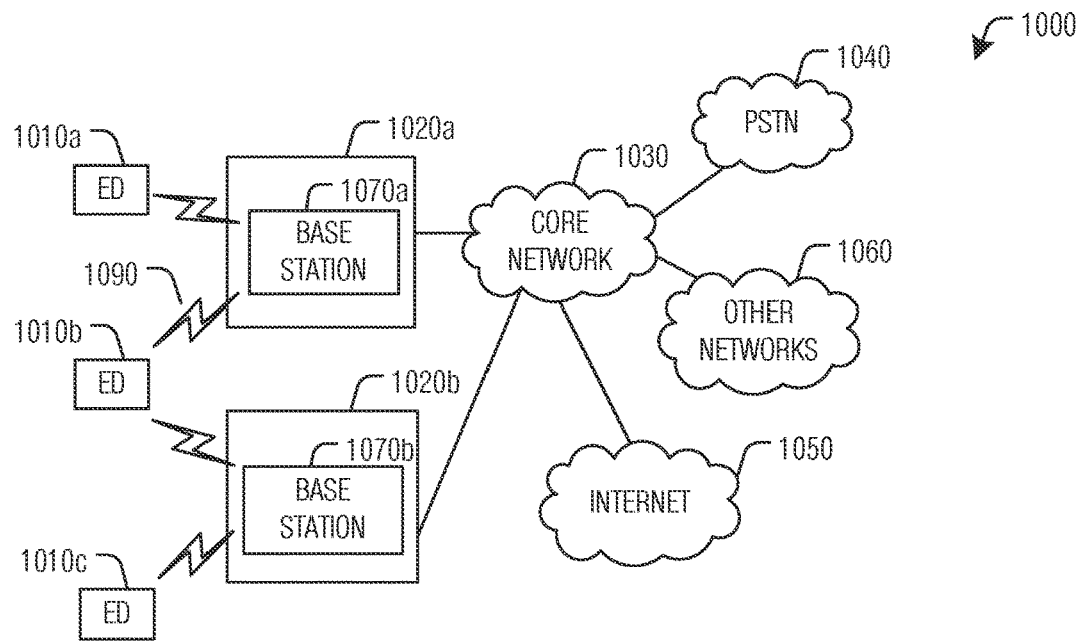
FIG. 10 illustrates an example communication system according to example embodiments presented herein.

FIG. 10 illustrates an example communication system 1000. In general, the system 1000 enables multiple wireless or wired users to transmit and receive data and other content. The system 1000 may implement one or more channel access methods, such as code division multiple access (CDMA), time division multiple access (TDMA), frequency division multiple access (FDMA), orthogonal FDMA (OFDMA), single-carrier FDMA (SC-FDMA), or non-orthogonal multiple access (NOMA).

In this example, the communication system 1000 includes electronic devices (ED) 1010a-1010c, radio access networks (RANs) 1020a-1020b, a core network 1030, a public switched telephone network (PSTN) 1040, the Internet 1050, and other networks 1060. While certain numbers of these components or elements are shown in FIG. 10, any number of these components or elements may be included in the system 1000.

The EDs 1010a-1010c are configured to operate or communicate in the system 1000. For example, the EDs 1010a-1010c are configured to transmit or receive via wireless or wired communication channels. Each ED 1010a-1010c represents any suitable end user device and may include such devices (or may be referred to) as a user equipment or device (UE), wireless transmit or receive unit (WTRU), mobile station, fixed or mobile subscriber unit, cellular telephone, personal digital assistant (PDA), smartphone, laptop, computer, touchpad, wireless sensor, or consumer electronics device.

The RANs 1020a-1020b here include base stations 1070a-1070b, respectively. Each base station 1070a-1070b is configured to wirelessly interface with one or more of the EDs 1010a-1010c to enable access to the core network 1030, the PSTN 1040, the Internet 1050, or the other networks 1060. For example, the base stations 1070a-1070b may include (or be) one or more of several well-known devices, such as a base transceiver station (BTS), a Node-B (NodeB), an evolved NodeB (eNodeB), a Next Generation (NG) NodeB (gNB), a Home NodeB, a Home eNodeB, a site controller, an access point (AP), or a wireless router. The EDs 1010a-1010c are configured to interface and communicate with the Internet 1050 and may access the core network 1030, the PSTN 1040, or the other networks 1060.

In the embodiment shown in FIG. 10, the base station 1070a forms part of the RAN 1020a, which may include other base stations, elements, or devices. Also, the base station 1070b forms part of the RAN 1020b, which may include other base stations, elements, or devices. Each base station 1070a-1070b operates to transmit or receive wireless signals within a particular geographic region or area, sometimes referred to as a "cell." In some embodiments, multiple-input multiple-output (MIMO) technology may be employed having multiple transceivers for each cell.

The base stations 1070a-1070b communicate with one or more of the EDs 1010a-1010c over one or more air interfaces 1090 using wireless communication links. The air interfaces 1090 may utilize any suitable radio access technology.

It is contemplated that the system 1000 may use multiple channel access functionality, including such schemes as described above. In particular embodiments, the base stations and EDs implement 5G New Radio (NR), LTE, LTE-A, or LTE-B. Of course, other multiple access schemes and wireless protocols may be utilized.

The RANs 1020a-1020b are in communication with the core network 1030 to provide the EDs 1010a-1010c with voice, data, application, Voice over Internet Protocol (VoIP), or other services. Understandably, the RANs 1020a-1020b or the core network 1030 may be in direct or indirect communication with one or more other RANs (not shown). The core network 1030 may also serve as a gateway access for other networks (such as the PSTN 1040, the Internet 1050, and the other networks 1060). In addition, some or all of the EDs 1010a-1010c may include functionality for communicating with different wireless networks over different wireless links using different wireless technologies or protocols. Instead of wireless communication (or in addition thereto), the EDs may communicate via wired communication channels to a service provider or switch (not shown), and to the Internet 1050.

Although FIG. 10 illustrates one example of a communication system, various changes may be made to FIG. 10. For example, the communication system 1000 could include any number of EDs, base stations, networks, or other components in any suitable configuration.

Figure 11A:
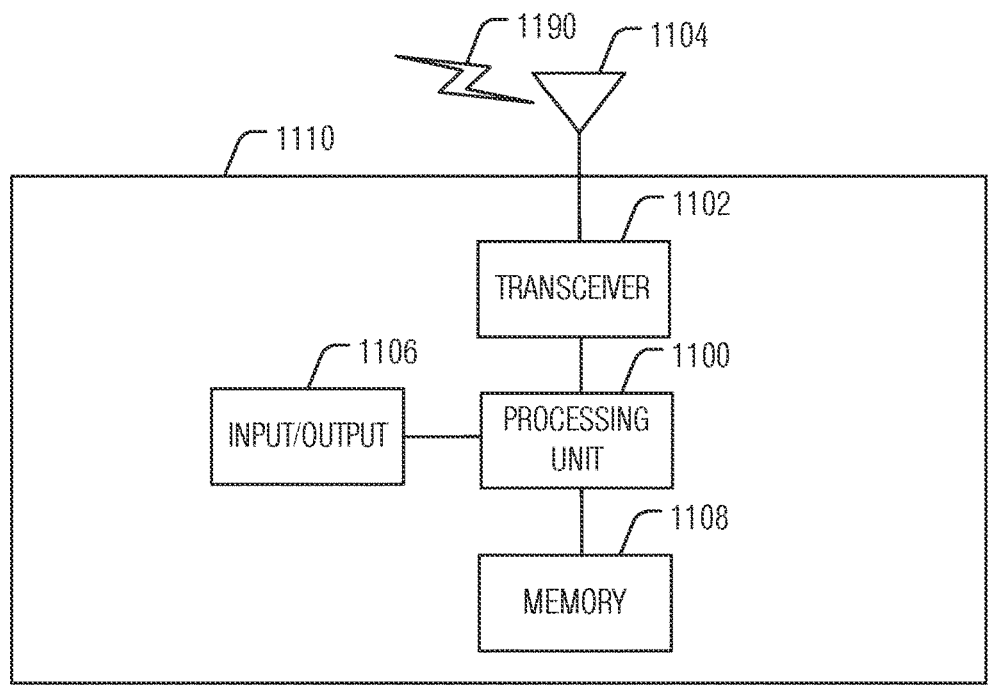
FIGS. 11A and 11B illustrate example devices that may implement the methods and teachings according to this disclosure.
Figure 11B:
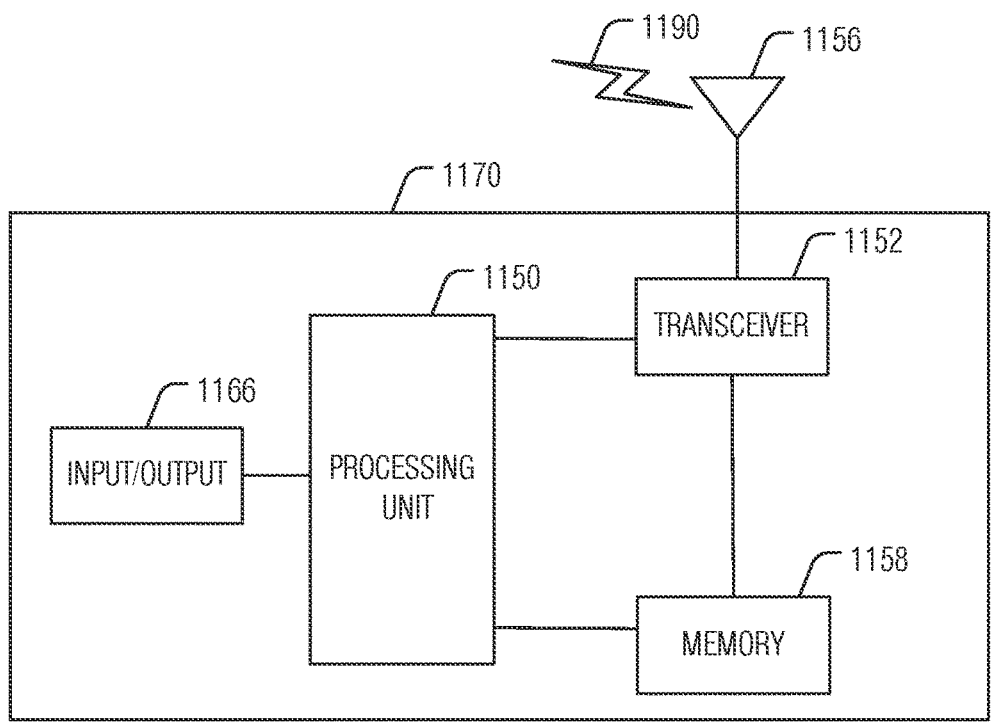

FIGS. 11A and 11B illustrate example devices that may implement the methods and teachings according to this disclosure. In particular, FIG. 11A illustrates an example ED 1110, and FIG. 11B illustrates an example base station 1170. These components could be used in the system 1000 or in any other suitable system.

As shown in FIG. 11A, the ED 1110 includes at least one processing unit 1100. The processing unit 1100 implements various processing operations of the ED 1110. For example, the processing unit 1100 could perform signal coding, data processing, power control, input/output processing, or any other functionality enabling the ED 1110 to operate in the system 1000. The processing unit 1100 also supports the methods and teachings described in more detail above. Each processing unit 1100 includes any suitable processing or computing device configured to perform one or more operations. Each processing unit 1100 could, for example, include a microprocessor, microcontroller, digital signal processor, field programmable gate array, or application specific integrated circuit.

The ED 1110 also includes at least one transceiver 1102. The transceiver 1102 is configured to modulate data or other content for transmission by at least one antenna or NIC (Network Interface Controller) 1104. The transceiver 1102 is also configured to demodulate data or other content received by the at least one antenna 1104. Each transceiver 1102 includes any suitable structure for generating signals for wireless or wired transmission or processing signals received wirelessly or by wire. Each antenna 1104 includes any suitable structure for transmitting or receiving wireless or wired signals. One or multiple transceivers 1102 could be used in the ED 1110, and one or multiple antennas 1104 could be used in the ED 1110. Although shown as a single functional unit, a transceiver 1102 could also be implemented using at least one transmitter and at least one separate receiver.

The ED 1110 further includes one or more input/output devices 1106 or interfaces (such as a wired interface to the Internet 1050). The input/output devices 1106 facilitate interaction with a user or other devices (network communications) in the network. Each input/output device 1106 includes any suitable structure for providing information to or receiving information from a user, such as a speaker, microphone, keypad, keyboard, display, or touch screen, including network interface communications.

In addition, the ED 1110 includes at least one memory 1108. The memory 1108 stores instructions and data used, generated, or collected by the ED 1110. For example, the memory 1108 could store software or firmware instructions executed by the processing unit(s) 1100 and data used to reduce or eliminate interference in incoming signals. Each memory 1108 includes any suitable volatile or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 11B, the base station 1170 includes at least one processing unit 1150, at least one transceiver 1152, which includes functionality for a transmitter and a receiver, one or more antennas 1156, at least one memory 1158, and one or more input/output devices or interfaces 1166. A scheduler, which would be understood by one skilled in the art, is coupled to the processing unit 1150. The scheduler could be included within or operated separately from the base station 1170. The processing unit 1150 implements various processing operations of the base station 1170, such as signal coding, data processing, power control, input/output processing, or any other functionality. The processing unit 1150 can also support the methods and teachings described in more detail above. Each processing unit 1150 includes any suitable processing or computing device configured to perform one or more operations. Each processing unit 1150 could, for example, include a microprocessor, microcontroller, digital signal processor, field programmable gate array, or application specific integrated circuit.

Each transceiver 1152 includes any suitable structure for generating signals for wireless or wired transmission to one or more EDs or other devices. Each transceiver 1152 further includes any suitable structure for processing signals received wirelessly or by wire from one or more EDs or other devices. Although shown combined as a transceiver 1152, a transmitter and a receiver could be separate components. Each antenna 1156 includes any suitable structure for transmitting or receiving wireless or wired signals. While a common antenna 1156 is shown here as being coupled to the transceiver 1152, one or more antennas 1156 could be coupled to the transceiver(s) 1152, allowing separate antennas 1156 to be coupled to the transmitter and the receiver if equipped as separate components. Each memory 1158 includes any suitable volatile or non-volatile storage and retrieval device(s). Each input/output device 1166 facilitates interaction with a user or other devices (network communications) in the network. Each input/output device 1166 includes any suitable structure for providing information to or receiving/providing information from a user, including network interface communications.

Figure 12:
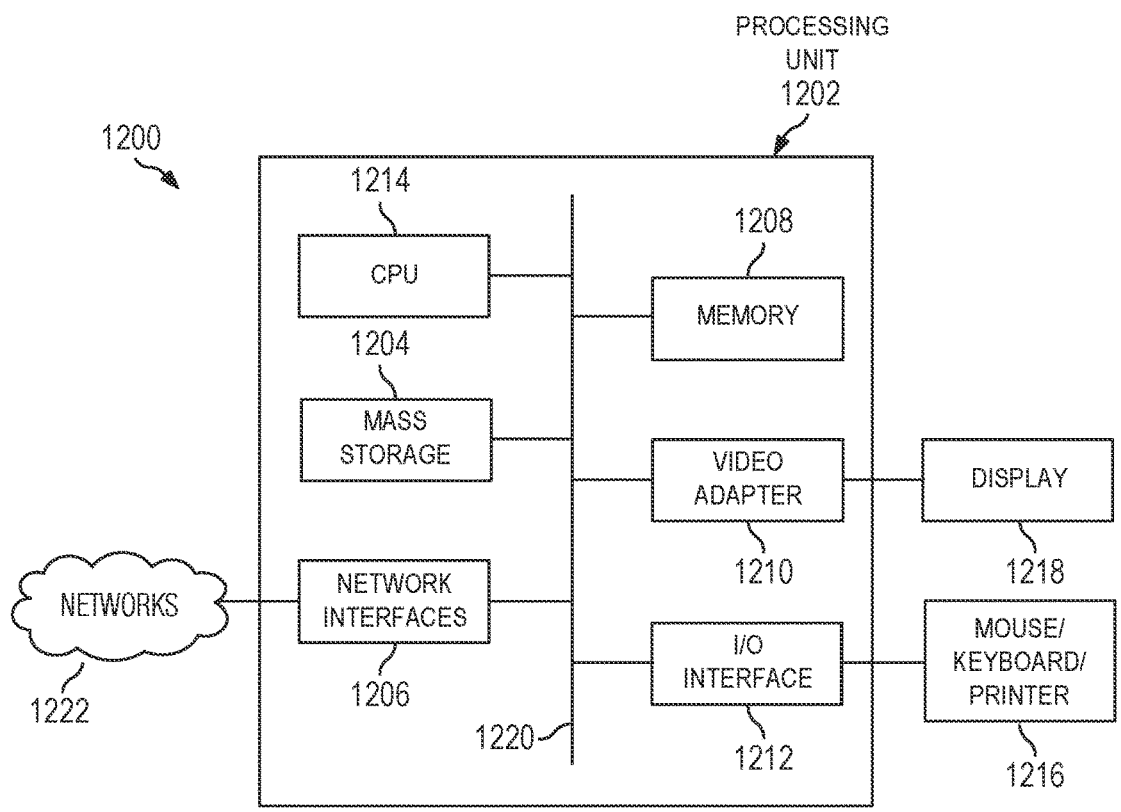
FIG. 12 is a block diagram of a computing system that may be used for implementing the devices and methods disclosed herein.

FIG. 12 is a block diagram of a computing system 1200 that may be used for implementing the devices and methods disclosed herein. For example, the computing system can be any entity of UE, access network (AN), mobility management (MM), session management (SM), user plane gateway (UPGW), or access stratum (AS). Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 1200 includes a processing unit 1202. The processing unit includes a central processing unit (CPU) 1214, memory 1208, and may further include a mass storage device 1204, a video adapter 1210, and an I/O interface 1212 connected to a bus 1220.

The bus 1220 may be one or more of any type of several bus architectures including a memory bus or memory controller, a peripheral bus, or a video bus. The CPU 1214 may comprise any type of electronic data processor. The memory 1208 may comprise any type of non-transitory system memory such as static random access memory (SRAM), dynamic random access memory (DRAM), synchronous DRAM (SDRAM), read-only memory (ROM), or a combination thereof. In an embodiment, the memory 1208 may include ROM for use at boot-up, and DRAM for program and data storage for use while executing programs.

The mass storage 1204 may comprise any type of non-transitory storage device configured to store data, programs, and other information and to make the data, programs, and other information accessible via the bus 1220. The mass storage 1204 may comprise, for example, one or more of a solid state drive, hard disk drive, a magnetic disk drive, or an optical disk drive.

The video adapter 1210 and the I/O interface 1212 provide interfaces to couple external input and output devices to the processing unit 1202. As illustrated, examples of input and output devices include a display 1218 coupled to the video adapter 1210 and a mouse, keyboard, or printer 1216 coupled to the I/O interface 1212. Other devices may be coupled to the processing unit 1202, and additional or fewer interface cards may be utilized. For example, a serial interface such as Universal Serial Bus (USB) (not shown) may be used to provide an interface for an external device.

The processing unit 1202 also includes one or more network interfaces 1206, which may comprise wired links, such as an Ethernet cable, or wireless links to access nodes or different networks. The network interfaces 1206 allow the processing unit 1202 to communicate with remote units via the networks. For example, the network interfaces 1206 may provide wireless communication via one or more transmitters/transmit antennas and one or more receivers/receive antennas. In an embodiment, the processing unit 1202 is coupled to a local-area network 1222 or a wide-area network for data processing and communications with remote devices, such as other processing units, the Internet, or remote storage facilities.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a determining unit or module, a configuring unit or module, a projecting unit or module, a specifying unit or module, an adapting unit or module, a detecting unit or module, or an adjusting unit or module. The respective units or modules may be hardware, software, or a combination thereof. For instance, one or more of the units or modules may be an integrated circuit, such as field programmable gate arrays (FPGAs) or application-specific integrated circuits (ASICs).

Although the present disclosure and its advantages have been described in detail, it should be understood that various changes, substitutions and alterations can be made herein without departing from the spirit and scope of the disclosure as defined by the appended claims.

The invention claimed is:

1. A method implemented by an access node, the method comprising:
   receiving, by the access node, motion information from a user equipment (UE) in accordance with a communications beam;
   determining, by the access node, a predicted location of the UE in accordance with the motion information;
   configuring, by the access node, multiple tracking beams in accordance with the predicted location of the UE, wherein configuring the multiple tracking beams comprises specifying a beamwidth of the multiple tracking beams and a beamforming gain of the multiple tracking beams;
   sending, by the access node, the multiple tracking beams;
   receiving, by the access node, updated motion information from the UE, wherein the updated motion information indicates when the UE is moving towards the access node and when the UE is moving away from the access node; and
   adapting, by the access node, the multiple tracking beams in accordance with the updated motion information, wherein adapting the multiple tracking beams comprises increasing the beamwidth of the multiple tracking beams in response to the UE moving towards the access node and increasing the beamforming gain of the multiple tracking beams in response to the UE moving away from the access node.

2. The method of claim 1, wherein the motion information is relative to the access node.

3. The method of claim 1, wherein configuring the multiple tracking beams further comprises specifying a number of the multiple tracking beams.

4. The method of claim 1, wherein the motion information comprises at least one of directional information of the UE or velocity information of the UE.

5. The method of claim 3, wherein adapting the multiple tracking beams further comprises adjusting the number of the multiple tracking beams.

6. The method of claim 1, wherein the multiple tracking beams comprises at least one channel state information reference signal (CSI-RS) resource set.

7. A method implemented by a user equipment (UE), the method comprising:
   detecting, by the UE, motion information of the UE using a built-in sensor;
   sending, by the UE, the motion information to an access node in accordance with a communications beam;
   receiving, by the UE, a first tracking beam, wherein the first tracking beam is configured in accordance with the motion information;
   detecting, by the UE, updated motion information of the UE using the built-in sensor;
   sending, by the UE, the updated motion information to the access node, wherein the updated motion information indicates when the UE is moving towards the access node and when the UE is moving away from the access node; and
   receiving, by the UE, a second tracking beam, wherein the second tracking beam is configured in accordance with the updated motion information, wherein the second tracking beam has a larger beamwidth than the first tracking beam when the UE is moving towards the access node and has a larger beamforming gain than the first tracking beam when the UE is moving away from the access node.

8. The method of claim 7, wherein the motion information comprises at least one of directional information of the UE or velocity information of the UE.

9. The method of claim 7, further comprising projecting, by the UE, the motion information onto a coordinate system to obtain components of the motion information.

10. An access node comprising:
    a non-transitory memory storage comprising instructions; and
    one or more processors in communication with the memory storage, wherein the one or more processors execute the instructions to:
      receive motion information from a user equipment (UE) in accordance with a communications beam,
      determine a predicted location of the UE in accordance with the motion information,
      configure multiple tracking beams in accordance with the predicted location of the UE by specifying a beamwidth of the multiple tracking beams and a beamforming gain of the multiple tracking beams,
      send the multiple tracking beams,
      receive updated motion information from the UE, wherein the updated motion information indicates when the UE is moving towards the access node and when the UE is moving away from the access node, and
      adapt the multiple tracking beams in accordance with the updated motion information by increasing the beamwidth of the multiple tracking beams in response to the UE moving towards the access node and increasing the beamforming gain of the multiple tracking beams in response to the UE moving away from the access node.

11. The access node of claim 10, wherein the one or more processors further execute the instructions to specify a number of the multiple tracking beams.

12. The access node of claim 10, wherein the motion information comprises at least one of directional information of the UE or velocity information of the UE.

13. The access node of claim 11, wherein the one or more processors further execute the instructions to adjust the number of the multiple tracking beams.

14. The access node of claim 10, wherein the multiple tracking beams comprises at least one channel state information reference signal (CSI-RS) resource set.

15. A user equipment (UE) comprising:
    a non-transitory memory storage comprising instructions; and
    one or more processors in communication with the memory storage, wherein the one or more processors execute the instructions to:
      detect motion information of the UE using a built-in sensor,
      send the motion information to an access node in accordance with a communications beam,
      receive a first tracking beam, wherein the first tracking beam is configured in accordance with the motion information,
      detect updated motion information of the UE using the built-in sensor,
      send the updated motion information to the access node, wherein the updated motion information indicates when the UE is moving towards the access node and when the UE is moving away from the access node, and
      receive a second tracking beam, wherein the second tracking beam is configured in accordance with the updated motion information, wherein the second tracking beam has a larger beamwidth than the first tracking beam when the UE is moving towards the access node and has a larger beamforming gain than the first tracking beam when the UE is moving away from the access node.

16. The UE of claim 15, wherein the one or more processors further execute the instructions to project the motion information onto a coordinate system to obtain components of the motion information.

17. The UE of claim 15, wherein the motion information is relative to the UE.

18. The access node of claim 10, wherein the motion information is relative to the access node.

19. The method of claim 7, wherein the motion information is relative to the UE.

* * * * *